UNITED STATES PATENT OFFICE.

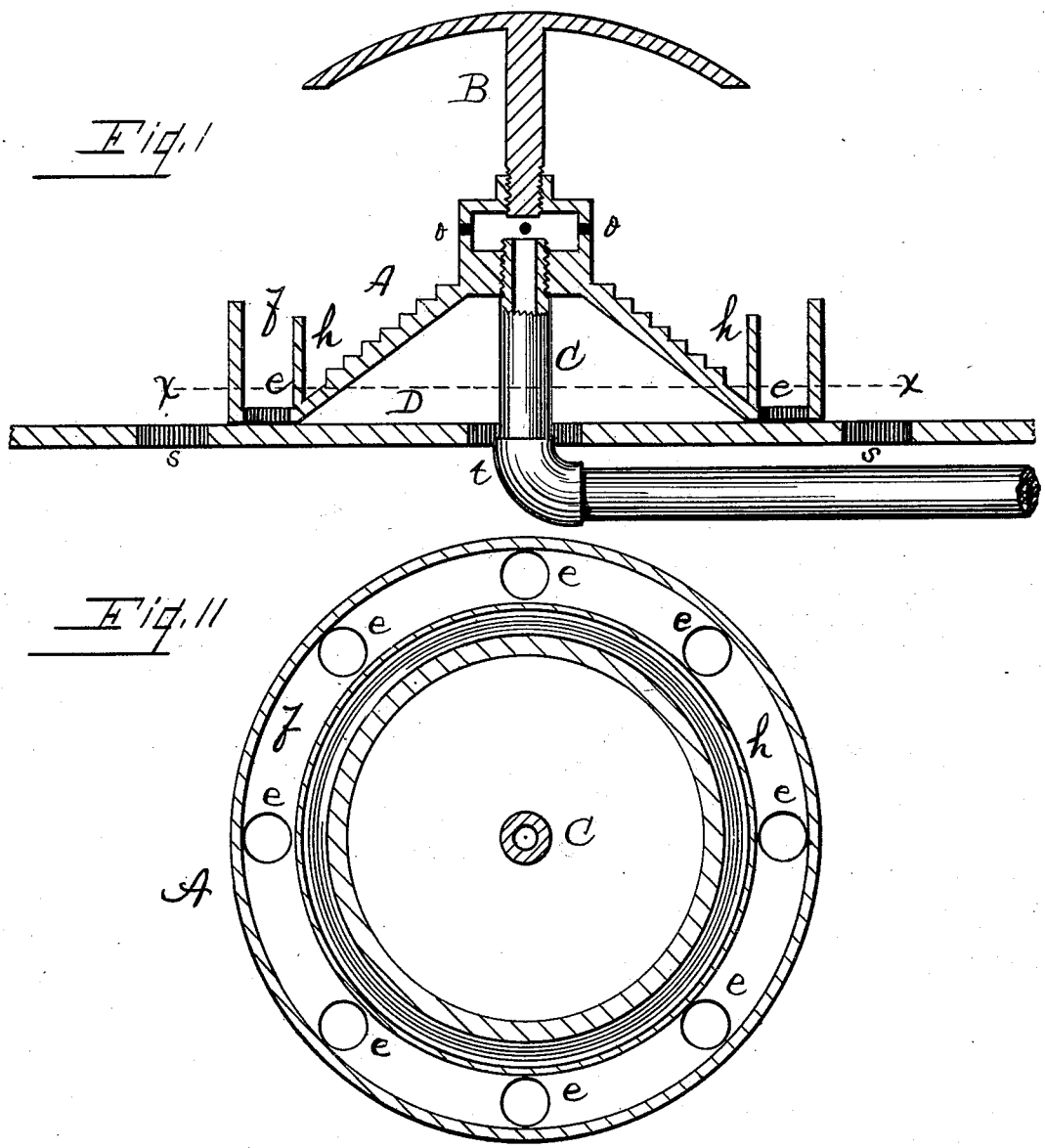

JAMES AKIN, OF DAYTON, OHIO.

HYDROCARBON-BURNER.

SPECIFICATION forming part of Letters Patent No. 400,889, dated April 9, 1889.

Application filed March 9, 1888. Serial No. 266,769. (No model.)

*To all whom it may concern:*

Be it known that I, JAMES AKIN, a citizen of the United States, residing at Dayton, in the county of Montgomery and State of Ohio, have invented certain new and useful Improvements in Hydrocarbon-Burners; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

My invention relates to improvements in hydrocarbon-burners, the several features of which will be fully hereinafter set forth.

The object of my invention is to disseminate the oil over an extended surface to favor combustion, which I accomplish by a cone-shaped burner having a series of concentric ledges on its upper surface, discharge-orifices at the top, a rim at the bottom to prevent any overflow of the oil, and a supply-pipe attached at the center from beneath.

The mechanism is illustrated in the accompanying drawings, in which—

Figure 1 is a transverse vertical section of the device with the exception of the induction-pipe. Fig. 2 is a horizontal section of the same on the line $x$, Fig. 1.

Like letters designate like parts throughout the several views.

The burner A is circular in its horizontal dimensions. The body is cone-shaped, and on its upper surface are a series of concentric ledges. At the top is an elevated hollow part or chamber having a series of eduction-orifices, $o$, through the sides, and in which part is screwed the induction-pipe C, and in the top of the same is screwed the heater or reflector B. At the base of the cone is the rim $h$, and external to this is the rim $f$, and between the two rims are a series of orifices, $e$. The external rim is advantageous, coupled with the orifices, to admit the air and direct the same to the rising vapor.

D is a plate which may be placed in the fire-pot of a stove or other chamber, and on which the burner may be supported. This plate is provided with air-orifices $s$ and a central orifice, $t$, for the induction-pipe.

The reflector-heater B is used to reflect the heat onto the vaporizing-surface of the burner and to transmit the accumulated heat through the stem to heat the oil in the chamber of the burner.

In use the induction-pipe is connected to an elevated reservoir, and the burner may be held in the fire-pot of a stove or a heating-chamber in any convenient manner.

The operation is thus: Open a stop-cock of the induction-pipe, having previously put some porous or textile material within the rim $h$ of the burner. The flow of the oil over the surface of the burner is then ignited, and the accumulation of heat, as above specified, causes the vapor to form rapidly and produces intense combustion.

The burner may be used whenever it is desirable to produce heat by the consumption of oil.

Having fully described my invention, what I claim, and desire to secure by Letters Patent, is—

1. A hydrocarbon-burner comprising a truncated cone having a series of concentric ledges with a rim at its base, a chamber at the top with eduction-orifices, and an orifice beneath for the introduction of an induction-pipe, substantially as set forth.

2. A hydrocarbon-burner comprising a truncated cone with a series of ledges and induction-pipe connection at the top, rim $h$ at the base, and rim $f$, with a series of air-orifices between said rims, substantially as set forth.

3. A hydrocarbon-burner comprising a truncated cone having a series of concentric ledges, with rim $h$ at its base and chambered at the top, with orifice for an induction-pipe and eduction-orifices, and the reflector B, attached to the top, substantially as set forth.

In testimony that I claim the foregoing as my own I affix my signature in presence of two witnesses.

JAMES AKIN.

Witnesses:
B. PICKERING,
CHAS. A. WALTMIRE.